United States Patent [19]

Schneiders

[11] Patent Number: 4,759,169
[45] Date of Patent: Jul. 26, 1988

[54] APPARATUS FOR PACKING CONIFEROUS TREES, THIS HAVING A MECHANICAL GRIPPER

[76] Inventor: Hermann Schneiders, Apostelstrasse 40, D-4100 Duisburg 13, Fed. Rep. of Germany

[21] Appl. No.: 44,510
[22] PCT Filed: Aug. 26, 1986
[86] PCT No.: PCT/DE86/00340
§ 371 Date: May 15, 1987
§ 102(e) Date: May 15, 1987
[87] PCT Pub. No.: WO87/01357
PCT Pub. Date: Mar. 12, 1987

[30] Foreign Application Priority Data

Aug. 30, 1985 [DE] Fed. Rep. of Germany ....... 3531013

[51] Int. Cl.⁴ .......................... B65B 13/20; B65B 9/15
[52] U.S. Cl. .......................................... 53/530; 53/576
[58] Field of Search .......................... 53/530, 576, 567; 100/13

[56] References Cited

U.S. PATENT DOCUMENTS 3,416,434 5/1967 Woserau et al. .
3,426,359 2/1969 Broersma .
3,440,954 4/1969 Woserau .............................. 53/530
3,548,567 12/1970 Manetta .............................. 53/530

FOREIGN PATENT DOCUMENTS 3445648 7/1985 Fed. Rep. of Germany .

*Primary Examiner*—John Sipos
*Attorney, Agent, or Firm*—Watson, Cole, Grindle & Watson

[57] ABSTRACT

Conifers and other plants, in particular, those are to be used as Christmas trees, are advantageously packed securely and in a space-saving manner, using an apparatus that has a U-shaped frame which has on one side one or a plurality of funnels with associated net tubes and nets and other side has a gripper that can be moved on the frame, this gripper having a scissors joint with gripper jaws that are configured as blades and which can be opened and closed automatically when the gripper is moved back and forth.

The gripper jaws have a closing lock that can be released when the trunk of the tree is introduced into the mechanism and at one end has a withdrawal mechanism that acts on the tube and which opens the gripper jaws when this is done.

FIG. 2 is intended for this disclosure.

11 Claims, 4 Drawing Sheets

APPARATUS FOR PACKING CONIFEROUS TREES, THIS HAVING A MECHANICAL GRIPPER

BACKGROUND OF THE INVENTION

1. Field of the Invention The present invention relates to an apparatus used for packing coniferous trees.

2. The Prior Art

Apparatuses of this kind are used in particular to pack conifers that are used during the Christmas period predominantly as Christmas trees and to do so either in the forest or where they are felled, so that they take up as little room as possible and can be transported without suffering any damage. It has been found that the closer the branches can be pressed against the stem or trunk, the safer the transport will be and the smaller the amount of space that will be taken up by the trees.

In a known apparatus (DE-OS No. 32 42 912.6) a frame which can be towed behind a vehicle is provided, at one end of which there is a funnel device with a mesh tube and at the other end a gripper that can be moved on the frame in a guideway towards the funnel device. This gripper has a scissors joint with gripper jaws at one end, with the gripper being connected to a retainer rod and a tube that can be slid on this at the other end. The tube is acted on by a spring that rests against the retainer plate located at one end and can also slide on the retaining rod so that when the tube is moved the gripper jaws are either opened or pressed against the trunk of the tree by the action of the scissors joint. A hydraulic cylinder is used to move the tube. This hydraulic cylinder entails considerable investment and subsequent operating costs because of the hydraulic lines and control valves that are required. A further disadvantage lies in the fact that the opening and closing gripper or gripper jaws can get caught in the net that is pulled over the mesh tube and can pull this into the funnel with it as it is moved forward, this leading to a considerable consumption of net, quite apart from the fact that it is no longer possible to grip the tree easily. In principle, the same problems occur in the apparatus that is described in U.S. Pat. No. 3,440,954 in which the gripper jaws are always held in the closed position by a spring that exerts the force required to do this. In order to introduce the trunk of a Christmas tree, one or several operating personnel must force the trunk between the jaws, i.e., must open these jaws against the force of the spring. Also insufficient is the holding force with which the spring presses the two gripper jaws against each other so that proper manipulation, i.e., the passage of the Christmas tree through the funnel, cannot be guaranteed.

It is the task of the present invention to create a gripper for packing apparatuses used to pack Christmas trees, this being to a very large extent independent of any external intervention and which works in a reliable manner and which, in addition, is easy to operate and ensures that the Christmas tree is also passed through the funnel in the proper manner.

SUMMARY OF THE INVENTION According to the present invention, this task has been solved in that a releasable closing lock and a withdrawal mechanism that acts on the tube shortly before the end position is reached and which acts against the force of a cylinder spring is associated with the gripper jaws.

Using an apparatus of this kind, it is possible to introduce the gripper into the funnel when it is initially opened and thus secured by the closing lock, where the lock is then released by the trunk of the tree that is to be packed, so that the gripper jaws then hold the trunk or stem securely. Thus the cylinder spring ensures that the holding force of the gripper jaws is sufficient to draw the Christmas tree through the funnel and into the net. This takes place in that the gripper carriage is now drawn back with the gripper, whereupon the gripper is automatically opened by the correspondingly arranged and configured withdrawal mechanism at the end of the frame, so that the tree is free and can be further processed in that it can, for example, be loaded onto a truck, etc. At the same time, this withdrawal mechanism once again charges the hydraulic spring so that the whole apparatus is immediately available for the next work cycle without the need for intervention by any other operating personnel.

The present invention is, in particular, characterized in that an exclusively mechanical gripper has been created for a packing apparatus used for conifers, that works reliably since it is of simple design and has the required holding forces that are needed to draw either smaller or larger Christmas trees through the tube with the net. By using simple additional measures, the holding force can also be suitably matched to the particular application so that an apparatus of this kind is also versatile, which is also an advantage. Furthermore, it is an important advantage that the forces that are required to release the holding forces, i.e., for operating the gripper jaws and which act on the release mechanism, are small and can also be adjusted, which also has an important effect on the versatility of the overall apparatus. The only drive that is required is one for the gripper carriage and this also moves the gripper from the end position into the funnel and then, together with the Christmas tree that has been gripped, draws this through the funnel. In this regard, this drive system is also located in the most favourable area, i.e., in the area of the funnel, where the associated costs for control mechanisms and circuitry are extremely small. Finally, mention should be made of the fact that work safety is also increased and there is a smaller consumption of net, since it is possible to prevent the gripper becoming caught in the net on passing through the funnel.

Further details and advantages of the object according to the present invention are described in greater detail below on the basis of the drawings appended hereto.

DETAILED DESCRIPTION OF THE PREFERRED EMBODIMENT

Figure 1:
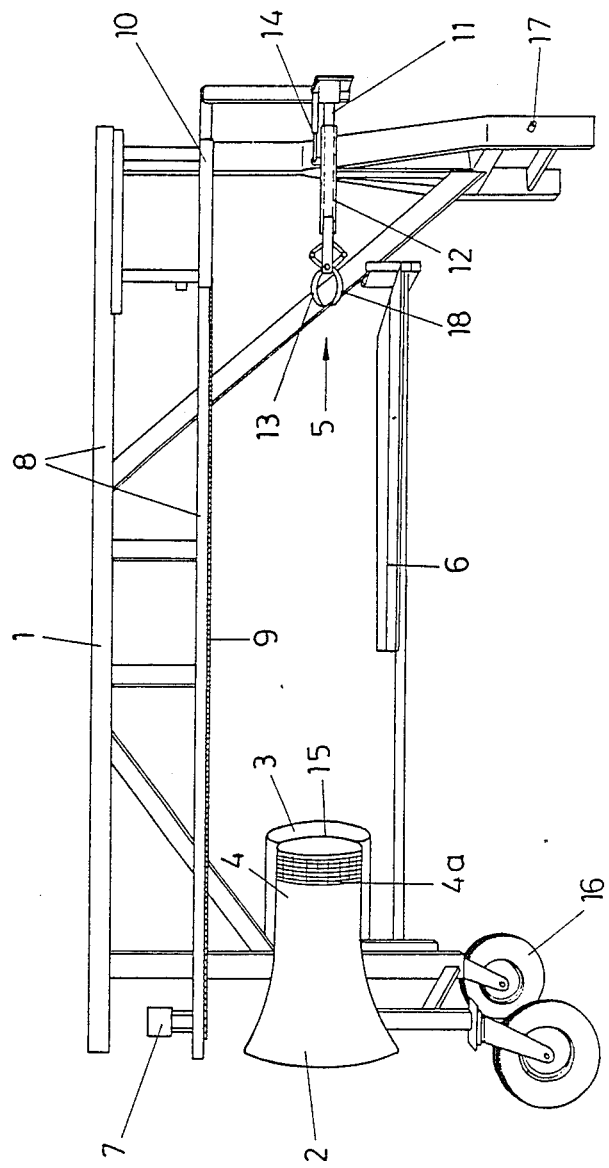
FIG. 1 shows an overall view of a preferred embodiment of the apparatus.

The apparatus that is used to pack conifers and other plants, as is shown in FIG. 1, has a U-shaped frame (1), in which both the funnels (2, 3) with the mesh tube (4) and the mesh (4a) as well as the moving gripper (5) are arranged. The U-shaped frame (1) is arranged such that the opening faces the ground and in addition, the moving parts are arranged on the basic frame and on the upper end of the frame (1) so that these components do not get dirty. This is particularly advantageous because apparatuses of this kind are used in woods and in muddy, inaccessible terrain where conditions are such that machinery can get extremely dirty. In addition, there is also the fact that freshly felled trees are to be processed.

The funnels (2, 3), which are of different diameters, are arranged on one arm of the U-shaped frame (1) and the gripper (5) is arranged in its end position on the other arm of the U-shaped frame. A table (6) is arranged between these two components, and the gripper (5) lays the packed tree on this shortly before it reaches its starting position.

The gripper (5) is connected through the conveyor drive system that moves on the rail (8) on an axis parallel to that of the funnel (2 or 3), and thus moves precisely on the axis of the particular funnel (2, 3). The conveyor drive system (7) draws the gripper carriage (10) either towards itself or away from itself by means of a chain (9), i.e., into the funnel (2 or 3) or, together with the tree that has been gripped, out of this. The gripper (5) has a retainer rod (11) and a tube (12) that is arranged on this so as to be able to slide, and a scissors joint (19) with gripper jaws (13, 18) is arranged between the end of the retainer rod and the tube.

At the end of the retainer rod or of the tube (11, 12) there is a withdrawal mechanism (14) by means of which the gripper (5) or the gripper jaws (13, 18) are opened by the rearward movement of the tube (12) shortly before the starting position that is shown in FIG. 1 is reached. In this opened position, the gripper (5) can be moved through the edge (15) of the mesh tube (4) and into the funnel (2 or 3), a net deflector being provided, this being described below. The frame (1) has at one end a three point coupling (17) for a three point linkage of a tractor, and wheels (16) at the other end, this making it possible to move the apparatus easily and rapidly.

Figure 2:
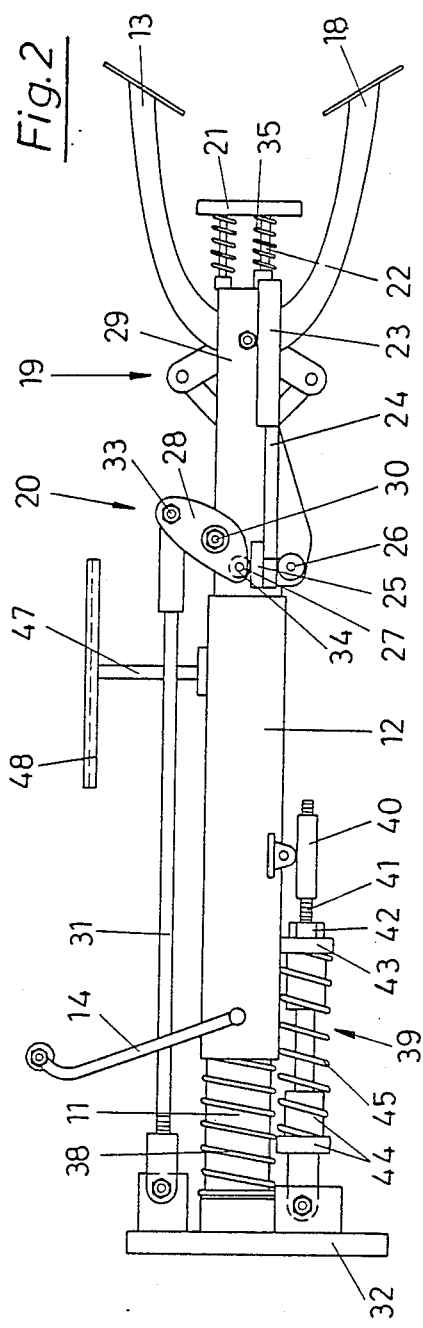
FIG. 2 shows a side view of the gripper.

FIG. 2 shows the gripper (5) on an enlarged scale; here, the opened working position is once more shown, i.e., the gripper jaws (13 and 18) are pivoted outwards by the withdrawal of the tube (12) on the retainer rod (11), this being done through the scissors joint (19). The closing lock (20) ensures that this position is maintained until such time as the trunk of a tree that is to be packed (not shown herein) is inserted, i.e., is slid in between the gripper jaws (13, 18). When such an object is inserted, this presses against the release plate (21) that is guided by means of a guide rod (22), this extending parallel to the tube (12) or to its arm (29). This guide rod (22) is first guided in or through the hollow tube (23) and then becomes a plate (24) that is supported at the end between the rollers (26, 27). The lower roller (26) is supported so as to be rotatable on the tube (12) or on the arm (29) whereas the roller (27) is associated with the release mechanism (28) that presses on the plate (24) or the lock plate (25) during such time as the situation that is shown in FIG. 2 exists. In contrast to this, if the release plate (21) is impacted and moved, the release mechanism (28) loses the required contact with the lock plate (25) and the tube (12) or the arm (29) can move forward and thus move the gripper jaws (13, 18) towards each other by means of the scissors joint (19), thereby closing the gripper (5).

The release mechanism is an eccentrically supported lever that is secured to the arm (29) by means of retaining screws (30) so as to be able to pivot; this is supported through the rod (31) on the retainer plate (32) and can also be blocked in a suitable position by means of the lock plate (25) and the roller (27). The retaining screw (30) is displaced towards the intended line of connection between the linkage junction point (33) and the roller connection point (34) and is arranged so as to be closer to the latter than to the linkage junction point (33).

In the event that the closing lock (20) is operated and the gripper (5) has been closed, the gripper jaws (13, 18) are opened automatically on reaching the starting or end point, this being done by means of the withdrawal mechanism (14), in that the tube (12) is of necessity moved back. This ensures that the closing lock (20) locks into position, since the guide rod (22) is acted on by the spring (35), this being under tension between the release plate (21) and the hollow tube (23). This means that the release plate (21) and thus the guide rod (22) and the lock plate (25) are drawn back into the holding position that is shown in FIG. 2, this being done by means of this spring (35).

The holding power that is needed for the gripper jaws (13, 18) is generated by the cylinder spring (38) that acts through the tube. In this regard, the holding power has been adjustable in that a spring system (39) has been provided in addition to the cylinder spring (38), it being possible to tighten or release this. In order to do this, the threaded rod (41) is first introduced into the slide guide (40) and then at the other end is secured to the holding plate (32) such that it can pivot. The two lock plates (43, 44) can be moved towards each other by means of the rotating element (42), this compressing the spring (45). In place of the rotating element (42) it is also possible to provide the lock plates (43, 44 or 43) with a thread that can be slid on the threaded rod (41).

Figure 3:
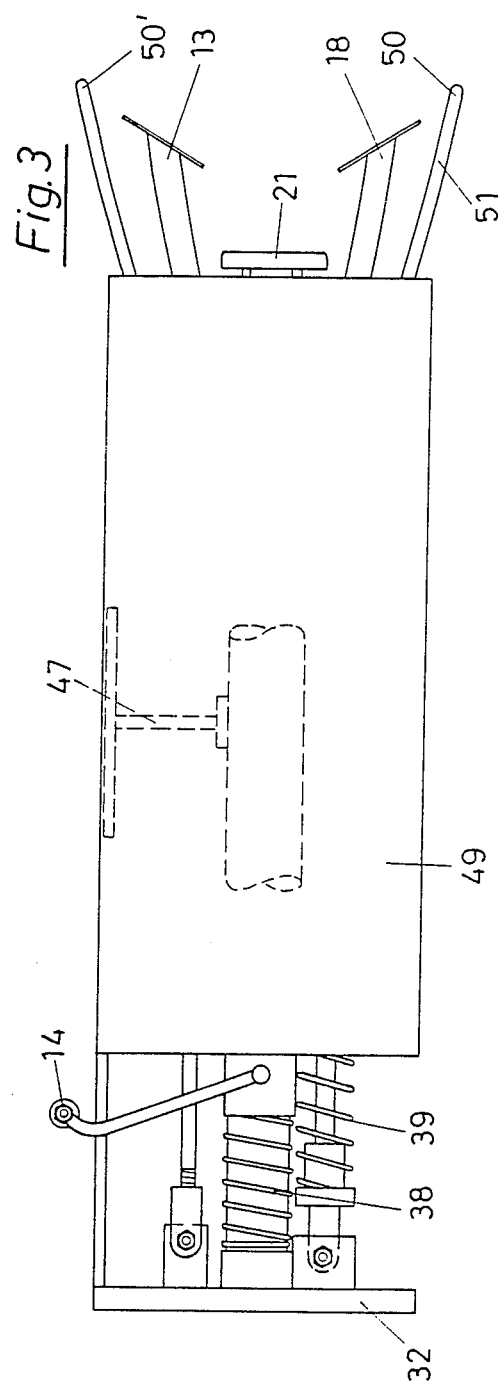
FIG. 3 shows the gripper, secured with the encasing tube, in side view.

The retainer rod (11) and the tube (12), including the scissors joint (19) are surrounded and enclosed by an encasing tube (49) that is supported or secured to the tube (12) by means of a T-shaped mounting (47) that has a curved flange (48). There are mesh deflectors (50) at the front end of this encasing tube (49) and these extend beyond the gripper jaws (13, 18) so as to make it possible to introduce the complete gripper (5) into the funnel (2, 3) without any parts getting hung up on the net (4a). The mesh deflectors (50) consist of rods that are appropriately curved (51) and these project laterally beyond the gripper jaws (13, 18). FIG. 3 shows such an apparatus in the open position. In this case, the casing tube (49) with the mesh deflectors (50, 50') are secured to the correspondingly curved flange (48) solely by means of two screws.

Figure 4:
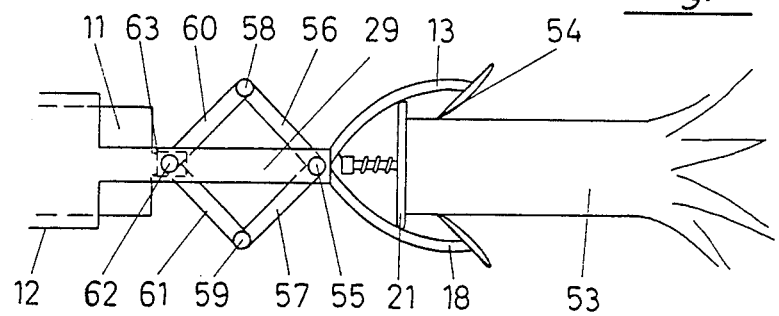
FIG. 4 shows the front part of the gripper with the gripper jaws and the scissors joint, in a side view.

FIG. 4 does not show the closing lock (20) with the release mechanism (28). Only the release plate (21) is shown. This represents the situation when the gripper jaws (13, 18) have just gripped the trunk (53) of a Christmas tree. To this end, they are equipped with cutter blades (54) that facilitate the gripping and securing of the trunk (53). The gripper jaws (13, 18) are closed in that the tube (12) is slid over the retainer rods (11) in the direction of the gripper jaws by means of the cylinder spring (38) that is not shown herein. Since the tube (12) is secured through the arm (29) at the scissors joint pivot (55) and, in contrast to this the retaining rod (11) is secured at the counter joint (62), this will affect the cutter blades (54) that are attached to the scissors grips (56, 57) and the scissors rods (60, 61) that are connected thereto through the joints (58, 59). The holder through which the retaining rod (11) secures the counter-joint (62) is here numbered (63).

Figure 5:
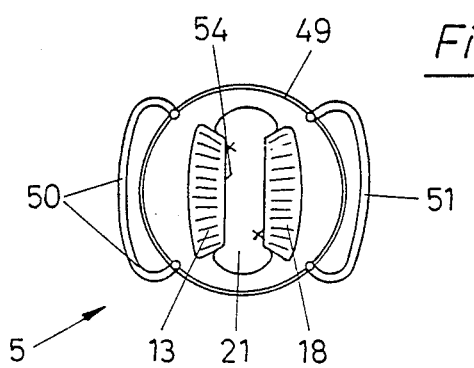
FIG. 5 shows an end view of the gripper.

FIG. 5 shows a front view of the grippers (5) that is provided with the encasing tube (49) and the mesh deflectors (50). Here it is clear that the individual gripper jaws (13, 18) are covered by the curved sections (51) of the net deflectors (50), so that they do not come into contact with the net on passing through the funnel (2 or 3). Also shown is the release plate (21) in which connection the crosses indicate where the guide rod (22) is secured or acts.

Figure 6:
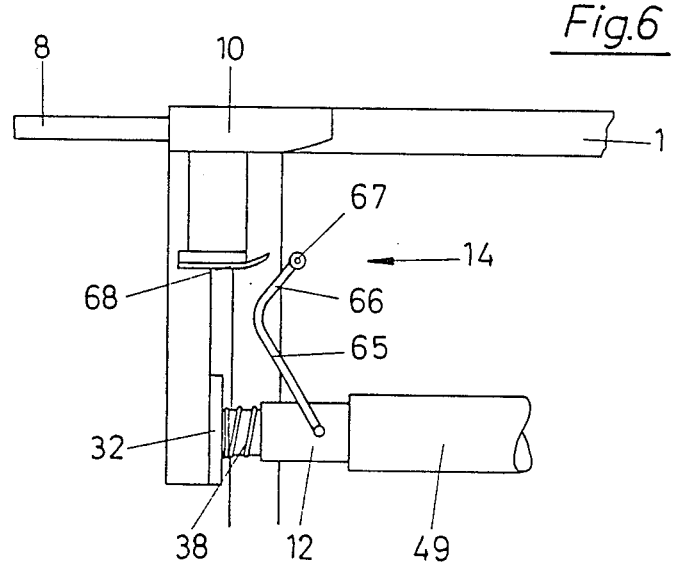
FIG. 6 shows the rear end of the gripper with the withdrawal mechanism.
Figure 7:
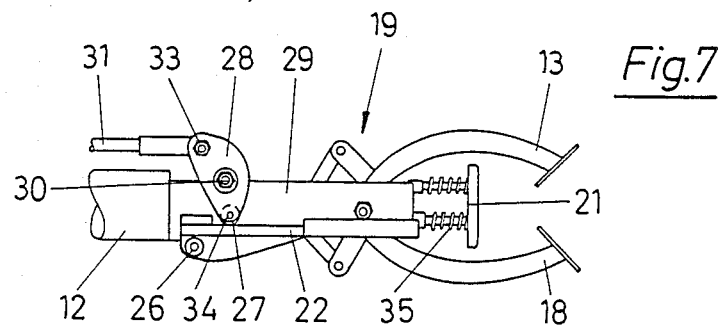
FIG. 7 shows a gripper in the closed position.
Figure 8:
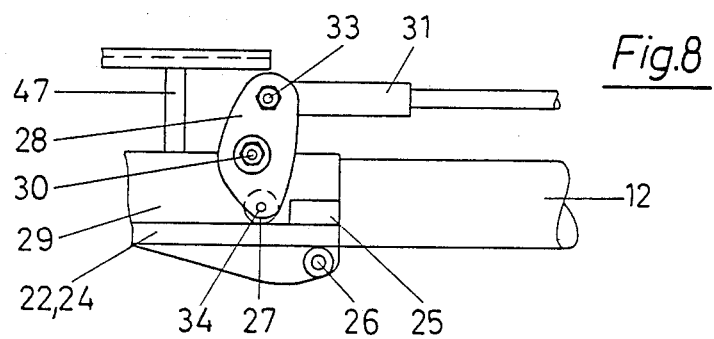
FIG. 8 shows the release mechanism in side view, in the closed position.

The gripper jaws (13, 18) are reopened by means of the withdrawal mechanism (14) that is shown in FIG. 6. On the tube (12) there is an angular lever (65) which at its free end (66) bears a ball bearing (67), and this rolls along the hold-down (68) when this passes and thus moves the tube (12) so that it moves against the force of the cylinder spring (38) and thereby opens the gripper jaws (13, 18).

Figure 9:
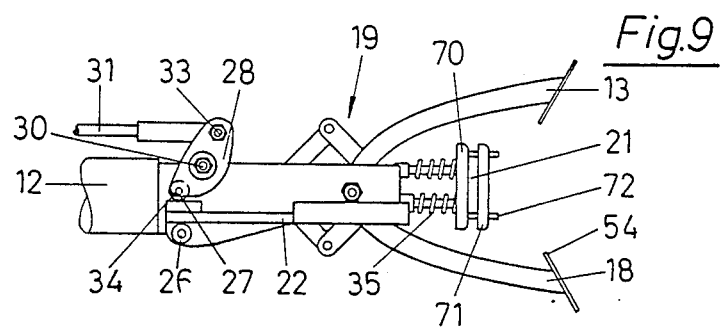
FIG. 9 shows the gripper in the open position.
Figure 10:
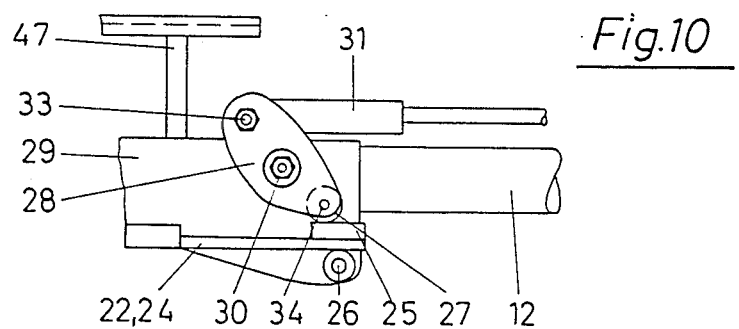
FIG. 10 shows the release mechanism in the position as shown in FIG. 9, in greater detail.

The FIGS. 7 to 10 show the gripper or the forward end of the gripper (5) in the closed and in the open state. Here it is plain that when the gripper (5) is closed, as can be seen from FIGS. 7 and 8, the closing lock (20) is released in that the roller (27) can no longer move on the plate (24) or on the guide rod (22), but rather is positioned above this. In the situation that is shown in FIGS. 9 and 10, on the other hand, the roller (27) is located on the lock plate (25) and is displaced relative to the linkage junction point (33) which means that the tube (12) is held by the retaining screw (30) and the rod (31) in the tensioned position, i.e., which holds the gripper jaws (13, 18). If pressure is now applied to the release plate (21) and this is done against the action of the spring (35), the lock plate (25) is pushed between the rollers (26, 27) so that the roller (26) is then free and the tube (12) jumps forward because it is loaded by the cylinder spring (38), this resulting in the position in which the gripper jaws (13, 18) are closed, as can be seen from figures 7 and 8.

However, FIG. 9 shows a special configuration in that here the release plate (21) consists of two plates (70, 71), these being connected to each other by means of screws (72). The release point can thus be displaced to any distance from the cutter blades (54) on the gripper jaws (13, 18).

What is claimed is:

1. An apparaus for the packaging of trees and plants for shipment, said apparatus comprising
   a frame which includes an elongated upper frame portion and first and second downwardly-extending support frame portions,
   a funnel means mounted on said first support frame portion for compressing the branches of a tree or plant pulled therethrough towards said second support frame portion, said funnel means defining an axis which constitutes a working axis of said apparatus,
   a mesh tube associated with said funnel for applying a mesh wrapping to a tree or plant pulled through said funnel means,
   a gripper carriage which is movably connected to said elongated upper frame portion so as to be movable in parallel with said working axis, and
   a gripper mechanism mounted on said gripper carriage, said gripper mechanism including
     a retainer plate which is mountable on said gripper carriage,
     a retainer rod which is mounted at one end on said retainer plate and extends along said working axis to a free end,
     a tubular sleeve movably mounted around said retainer rod, said tubular sleeve including an arm portion which extends away from said retainer plate,
     a pair of gripper jaws for gripping a tree or plant trunk and for pulling it through said funnel means, scissor grips attached to said jaws and pivotally connected at one end at a first pivot joint on said arm portion and scissor rods pivotally connected at one end to the second end of said scissor grips and at the other end pivotally connected at a second pivot joint at said free end of said retainer rod, such that movement of said tubular sleeve along said retainer rod from a first position near said retainer plate to a second position remote from said retainer plate will cause said scissor grips to pivot about said first pivot joint from an open orientation to a closed orientation,
     a first spring for biasing said tubular sleeve towards said second position,
     a closing lock for locking said tubular sleeve in said first position pending positioning of a tree or plant trunk between said scissor grips,
   said closing lock including a control rod which is attached to said retainer plate and which extends in parallel with said retainer rod, a release mechanism rotatably attached to said arm portion and to said control rod, a release plate positioned between said scissor grips, and a lock plate connected with said release plate and positionable adjacent to said release mechanism, said lock plate being positionable to (1) prevent rotation of said release mechanism with respect to said arm portion and said control rod and thus prevent movement of said tubular sleeve from said first position towards said second position, or (2) allow rotation of said release mechanism with respect to said arm portion and said control rod and thus allow said first spring to move said tubular sleeve from said first position towards said second position, and
   a withdrawal device for moving said tubular sleeve from said second position back to said first position when said gripper carriage moves said gripper mechanism adjacent said second downwardly-extending frame portion.

2. An apparatus as defined in claim 1, wherein said locking plate is mounted on a support plate which is connected to said release plate by a guide rod that extends through a hollow tube attached to said arm portion.

3. An apparatus as defined in claim 2, including a second spring positioned around said guide rod and between said release plate and said hollow tube.

4. An apparatus as defined in claim 1, wherein said release mechanism comprises an angular lever which has opposite first and second ends, wherein said first end is rotatably connected to said control rod, wherein said second end mounts a roller which is abuttable against said locking plate, and wherein said angular lever is rotatably attached to said arm portion at a point between said opposite first and second ends.

5. An apparatus as defined in claim 4, wherein said point of said angular lever where said angular lever is rotatably attached to said arm portion is closer to said second end than said first end.

6. An apparatus as defined in claim 1, wherein said release plate comprises two plates which are adjustably spaced apart by screw connectors.

7. An apparatus as defined in claim 1, including an adjustable tensioning mechanism connected between said retainer plate and said tubular sleeve for adjusting the force of said first spring on said tubular sleeve.

8. An apparatus as defined in claim 1, including a linear rail mounted on said upper frame portion and along which said gripper carriage is movable and wherein said withdrawal device includes a hold-down element extending downwardly from said rail adjacent said second support frame portion and a lever which is attached at one end to said tubular sleeve and which mounts a ball bearing at its other end, said ball bearing being engageable with said hold-down element.

9. An apparatus as defined in claim 1, including a casing tube around said tubular sleeve, said casing tube mounting mesh deflectors which extend outwardly of and beyond said scissor grips.

10. An apparatus as defined in claim 9, wherein said mesh deflectors comprise looped round rods which have curved portions that extend in parallel with said scissor grips.

11. An apparatus as defined in claim 9, including a T-shaped mounting between said tubular sleeve and said casing tube.

* * * * *